Oct. 3, 1961  J. ARCURI  3,002,511
PORTABLE GRILLS

Filed Dec. 1, 1958  2 Sheets-Sheet 1

John Arcuri
INVENTOR.

Oct. 3, 1961  J. ARCURI  3,002,511
PORTABLE GRILLS
Filed Dec. 1, 1958  2 Sheets-Sheet 2
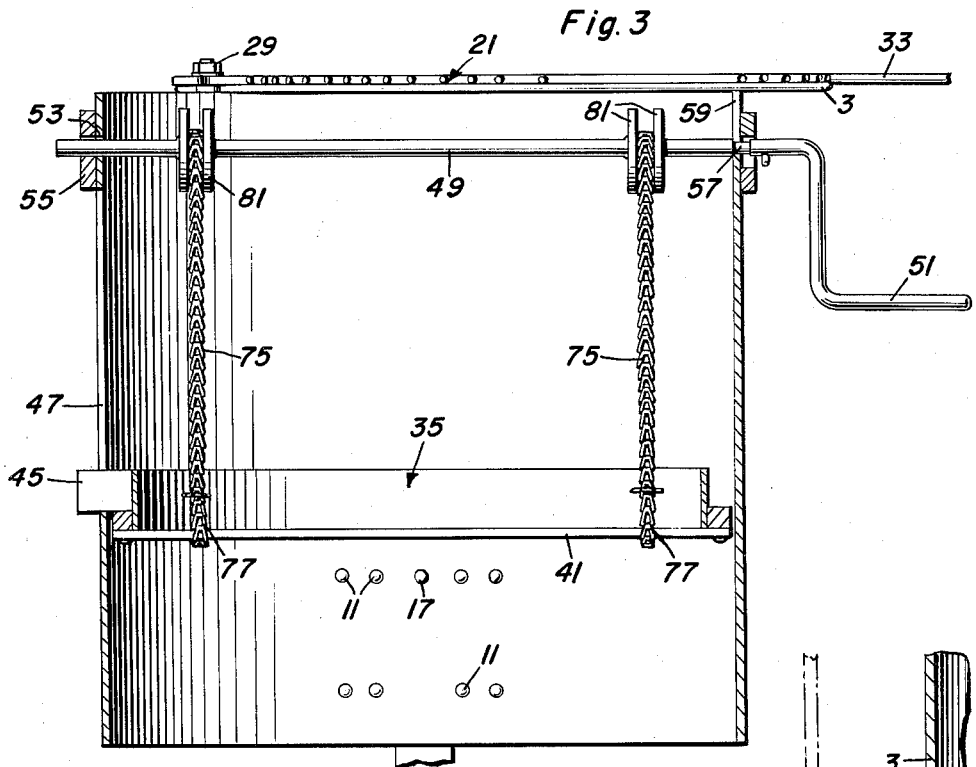
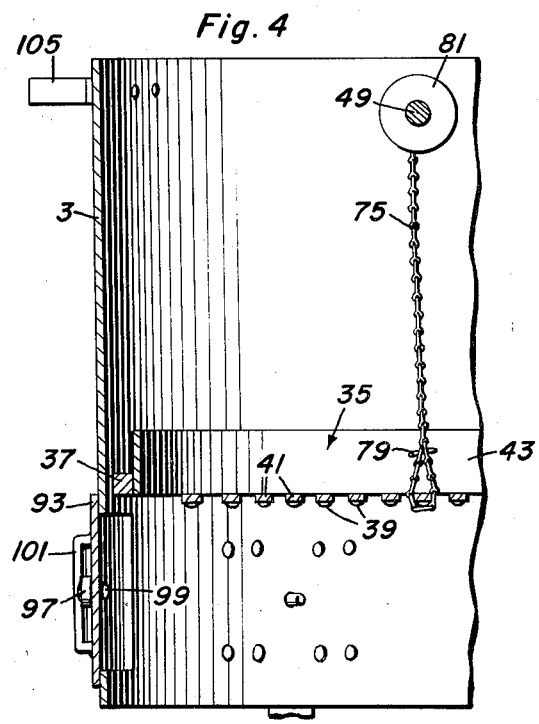
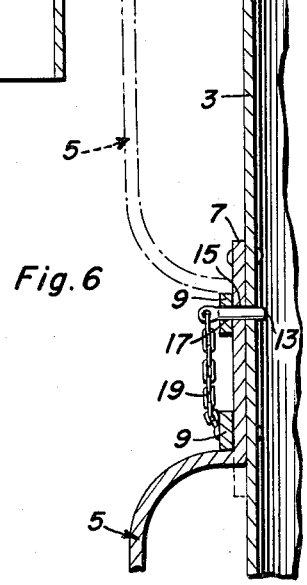
John Arcuri
INVENTOR.

United States Patent Office 3,002,511
Patented Oct. 3, 1961

3,002,511
PORTABLE GRILLS
John Arcuri, 3112 16th St., Tampa, Fla.
Filed Dec. 1, 1958, Ser. No. 777,349
5 Claims. (Cl. 126—25)

This invention relates to improvements in outdoor portable grills for cooking food especially by broiling the same over a charcoal bed of fire.

The primary object of the invention is to provide a grill for the above purposes which can be easily taken apart for storage in a small space and easily and quickly put together and in which a charcoal fire will burn with maximum heating efficiency and the cooking temperature of the fire may be varied as occasion may require.

Another object is to provide a grill according to the foregoing which is simple in construction, strong, and yet light in weight and inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged view in vertical section, partly broken away, and taken on the line 3—3 of FIGURE 2;

FIGURE 4 is a fragmentary enlarged view in vertical section taken on the line 4—4 of FIGURE 1;

FIGURE 6 is an enlarged fragmentary view in vertical section, partly in broken lines, and taken on the line 6—6 of FIGURE 1.

Figure 1:
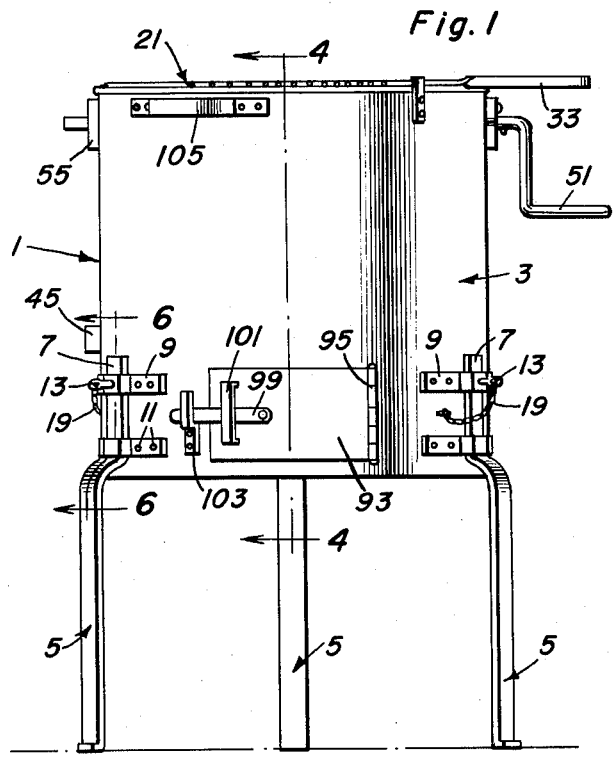
FIGURE 1 is a view in front elevation of the improved grill in the preferred embodiment thereof.

Referring to the drawings by numerals, according to this invention, a grill, designated generally by the numeral 1 is provided comprising a tubular casing 3 of any suitable metal supported in upright elevated position for updraft therethrough by removable bar metal legs 5 spaced circumferentially, equidistantly, around the casing 3 and which are formed with inwardly offset upper ends 7 slidably fitted upwardly in pairs of vertically spaced channel keepers 9 of strap metal secured to the casing 3 by rivets 11.

Locking pins 13 for retaining the legs 5 in place are removably inserted in holes 15 in the legs 5 and in mating holes, as at 17, in the upper keepers 9. Anchoring chains 19 for the pins 13 are suitably terminally attached to the pins 13 and to the casing 3.

A circular grid 21 is provided on top of the casing 3 for supporting food to be grilled, or cooked, in cooking utensils. The grid 21 is of the same diameter as the casing 3 and comprises an annular rim 23 on which are suitably fixed a diametrical hand lever 25 longitudinally slotted, and spaced cross rods 27 at opposite sides of the hand lever 25. The hand lever 25 embodies a rear end 26 pivoted, as at 29, on a side lug 31 on the casing 3 for swinging of the grid horizontally out of concentric covering position at the upper end of the casing 3, and a hand grip front end 33 extending outwardly of the grid 21 and the casing 3 for use in swinging said grid.

A circular grate 35 for a bed of charcoal, not shown, is provided to fit loosely in the casing 3 for raising and lowering for a purpose presently explained. The grate 35 comprises an annular frame member 37 having riveted thereto, as at 39, bottom laterally spaced grate bars 41, and a circular retaining annular band 43 is fitted and suitably secured in said frame member 37 to seat at its lower end on the grate bars 41 and extend above said frame member 37. A lateral vertical guide lug 45 on the band 43 slidably extends through a vertical slot 47 in the casing 3 to prevent rotation of the grate 35 during raising and lowering of said grate.

Manually operated means is provided for raising and lowering the grate 35 comprising a diametrical rotary shaft 49 in the upper portion of the casing 3 having an operating hand crank 51 on one end thereof. The shaft 49 is journaled, and longitudinally slidable at its other end in an aperture 53 in one side of the casing 3, and is similarly movable in a bearing bar 55 suitably secured to said casing 3.

Adjacent the crank end thereof, the shaft 49 is formed with a circumferential grooved portion 57 journaled in a vertical slot 59 in the casing 3. The portion 57 and slot 59 provide means for limiting longituidnal or endwise movement of the shaft 49.

Figure 5:
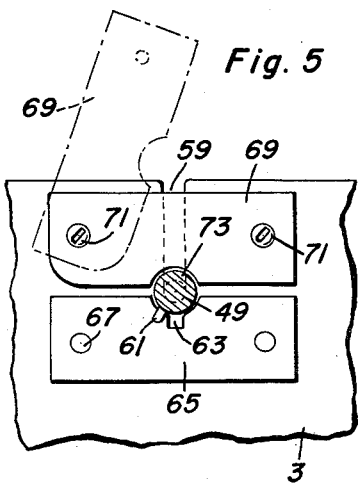
FIGURE 5 is an enlarged fragmentary view in side elevation.

Means is provided for locking the shaft 49 against rotation and for unlocking the same, comprising a lug 61 on said shaft movable into and out of a notch 63 in a locking bar 65 riveted, as at 67, to the outside of the casing 3. A hold down bar 69 for the shaft 49 is secured by a pair of screws 71 over the shaft 49 and above and in vertical alignment with the locking bar 69 with a notch 73 therein straddling the shaft 49. By removing one screw 71 the hold down bar 69 may be swung upwardly on the other screw, as shown in broken lines in FIGURE 5 so that the shaft 49 may be removed for cleaning by lifting it upwardly out of the slot 59 and sliding it out of the opening 53 and the bearing bar 55.

The shaft 49 is operatively connected to the grate 35 by a pair of windup chains 75 depending from said shaft 49 adjacent opposite sides of the casing 3 with lower looped ends 77 trained around a central one of the grate bars 41 with holding cotter pins 79 in said loops. The upper ends of the chains 75 are suitably connected to the shaft 49 between pairs of laterally spaced guide collars 81 suitably fixed on the shaft 49. The chains 75 permit moving the shaft 49 endwise to move the lug 61 into and out of the notch 63.

A door 93 is provided at the front of and adjacent the bottom of the casing 3 for access to the grate 35 when fully lowered and for convenience in igniting fuel on the grate 35. The door 93 is hinged at one end, as at 95, to the casing 3 for opening and closing. A conventional latch bar 97 is pivoted at one end, as at 99, to said door for vertical movement in a conventional guide 101 on said door and for engaging and disengaging the latch bar 97 with a conventional latch keeper 103 on the casing 3, whereby to latch the door 93 closed and unlatch said door for opening.

A pair of bail-type handles 105 are suitably fixed to the upper end portion and at opposite sides of the casing 3 for grasping to carry the grill.

Figure 2:
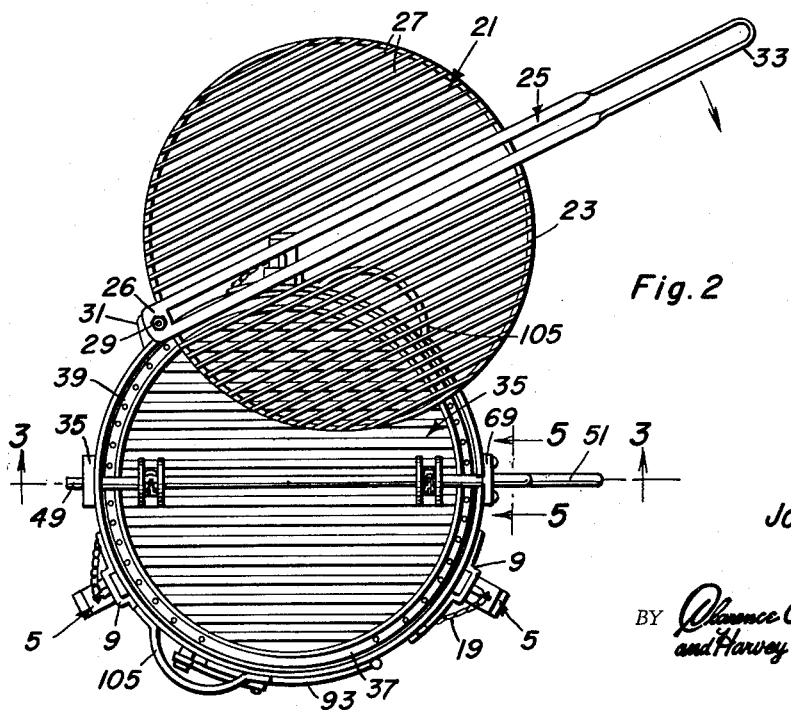
FIGURE 2 is a view in plan of the same.

The operation of the invention will be readily understood. With a bed of fire burning on the grate 35, food to be broiled, or otherwise cooked, is placed on the grid 21 with said grid swung into concentric covering relation to the top of the casing 3, as shown in FIGURE 1. The grate 35 is then raised or lowered by operation of the described manually operated means to adjust the fire bed toward or from the grid 21 for quick or slow broiling or cooking by varying the cooking temperature as desired. The grate 35 may be held in adjusted position by locking the shaft 49 against rotation by the described locking means for said shaft. The grid 21 may be swung part way off the casing 3 as shown in FIGURES 2 and 3 for quick grilling on one side of the grid while maintaining food on the other side of the grid warm from the heat emanating from the casing 3. The grid 21 may be swung completely to one side of the casing 3 for loading of the grate 35 with fuel and igniting the same, or, the door 93 may be used for that purpose when the grate 35 is fully lowered. The door 93 may be opened to vary updraft through the casing 3 as desired for varying the cooking temperature as will be clear. The legs 5 may be inverted with the ends 7 inserted downwardly in the keepers 9 to reduce the over-all height of the grill when carrying or storing the same.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. In a portable grill, the combination of a tubular casing having open upper and lower ends and provided at one side thereof with a vertically extending slot, a circular grate movable vertically in said casing and including an annular frame member slidably engaging the inner surface of the casing, a set of spaced grate bars extending transversely of and secured to the underside of said frame member, and an annular retainer band secured to the inner surface of said frame member, said band being of a greater vertical dimension than said frame member and having its lower edge resting on said grate bars whereby the upper edge of the band is spaced above the upper edge of the frame member, said frame member constituting means for spacing said retainer band radially inwardly from said casing, a guide lug secured to said band above said frame member and projecting radially outwardly therefrom through said slot whereby to prevent rotation of the grate in the casing, and means provided in the upper portion of the casing and operatively connected to said grate for raising and lowering the same.

2. In a portable grill, the combination of a tubular casing having an open upper end and provided at one side thereof with an open slot extending downwardly from said open upper end, the diametrically opposite side of the casing being formed with a bearing aperture, a shaft having one end portion thereof removably and rotatably journalled in said aperture, the other end portion of said shaft being provided with an annular groove of a greater width than the thickness of the side of said casing and the grooved portion of the shaft being removably and rotatably received in said slot whereby the shaft may be removed from the casing by withdrawal of the grooved portion through the open end of the slot and by withdrawal of its relatively opposite end portion from said aperture and whereby the shaft may be subjected to limited axial sliding movement when in the casing as permitted by the greater width of said groove relative to the thickness of the casing side, a hand crank provided at the grooved end portion of the shaft, a flexible element windable on said shaft and extending downwardly in the casing, a grate connected to the lower end of said flexible element and movable vertically in the casing upon rotation of the shaft, and means for releasably locking the shaft against rotation.

3. The device as defined in claim 2 wherein said last mentioned means comprises a lug secured exteriorly to said casing and provided with a semi-circular recess receiving the grooved portion of said shaft therein and also provided with a notch in said recess, and a projecting pin provided on said shaft adjacent the grooved portion thereof, said pin being removably receivable in said notch upon sliding of the shaft.

4. The device as defined in claim 2 together with means for removably retaining the grooved portion of the shaft in said slot, said last mentioned means comprising a locking bar movably secured to said casing above said shaft and spanning said slot.

5. In a portable grill, the combination of a casing having an open upper end and including a perimetric wall, a grate movable vertically in said casing and including a perimetric frame member slidably engaging the inner surface of said perimetric wall, a set of spaced grate bars extending transversely of and secured to the underside of said frame member, and a perimetric band secured to the inner surface of the frame member, said band being of a greater vertical dimension than the frame member and having its lower edge resting on said grate bars whereby the upper edge of the band is spaced above the upper edge of the frame member, said frame member constituting means for spacing said band inwardly from the perimetric wall of said casing, and means for supporting and moving said grate vertically in the casing.

References Cited in the file of this patent

UNITED STATES PATENTS

| | | | |
|---|---|---|---|
| (Grate) | McNary | Mar. 24, | 1835 |
| 221,682 | Kintz | Nov. 18, | 1879 |
| 1,756,384 | Porter | Apr. 29, | 1930 |
| 2,161,669 | Freeman | June 6, | 1939 |
| 2,473,569 | Cast | June 21, | 1949 |
| 2,501,075 | Miller | Mar. 21, | 1950 |
| 2,604,884 | Walker | July 29, | 1952 |
| 2,816,538 | Miller et al. | Dec. 17, | 1957 |
| 2,820,446 | Freeman | Jan. 21, | 1958 |
| 2,910,930 | Hankoff | Nov. 3, | 1959 |